July 4, 1950     M. J. THOMAS     2,513,974
JUICE EXTRACTING MACHINE
Filed June 19, 1944     2 Sheets-Sheet 1
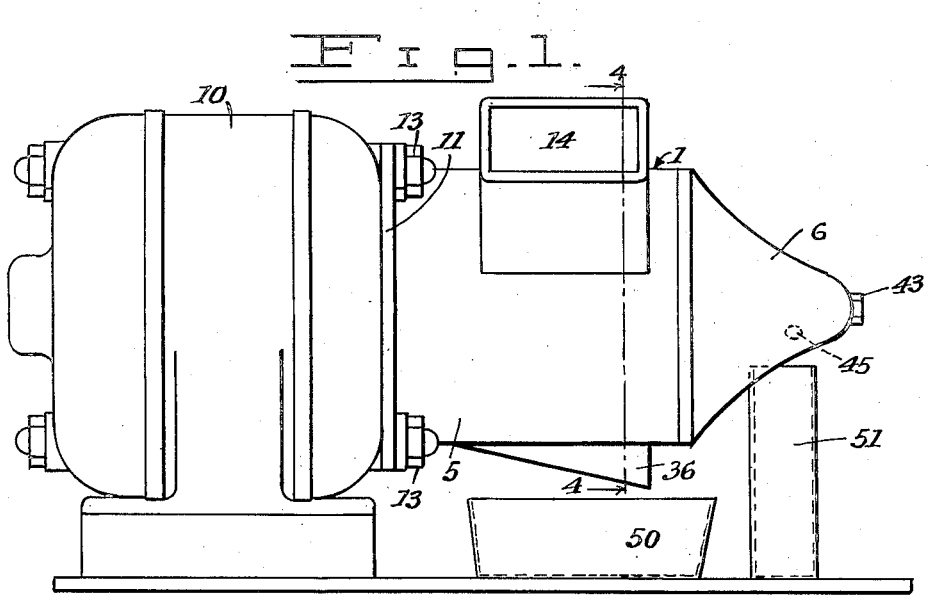
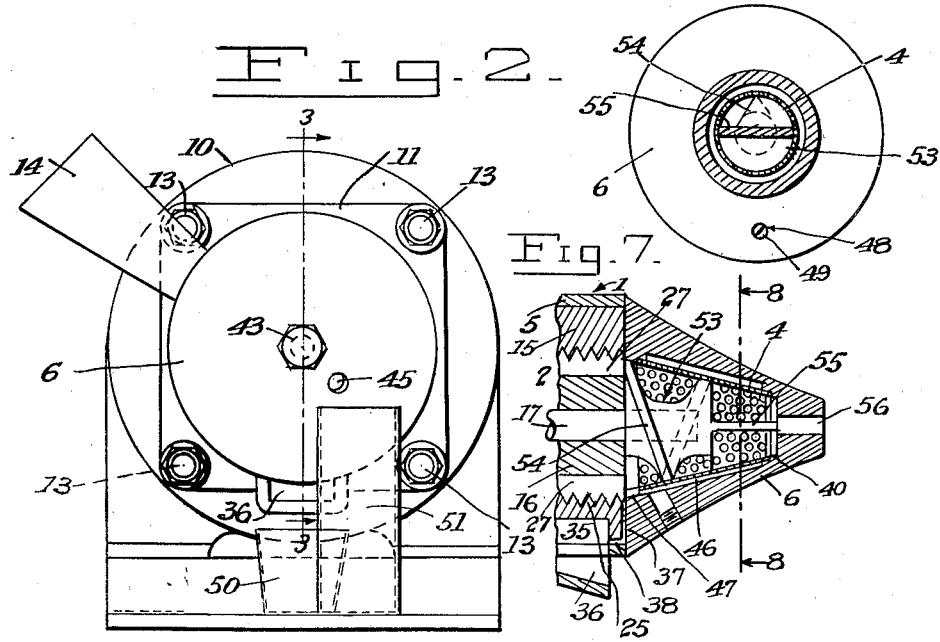
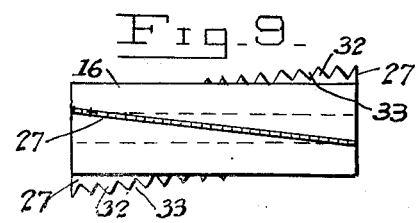
INVENTOR:
Matthew J. Thomas,
BY Alan Franklin,
ATTORNEY.

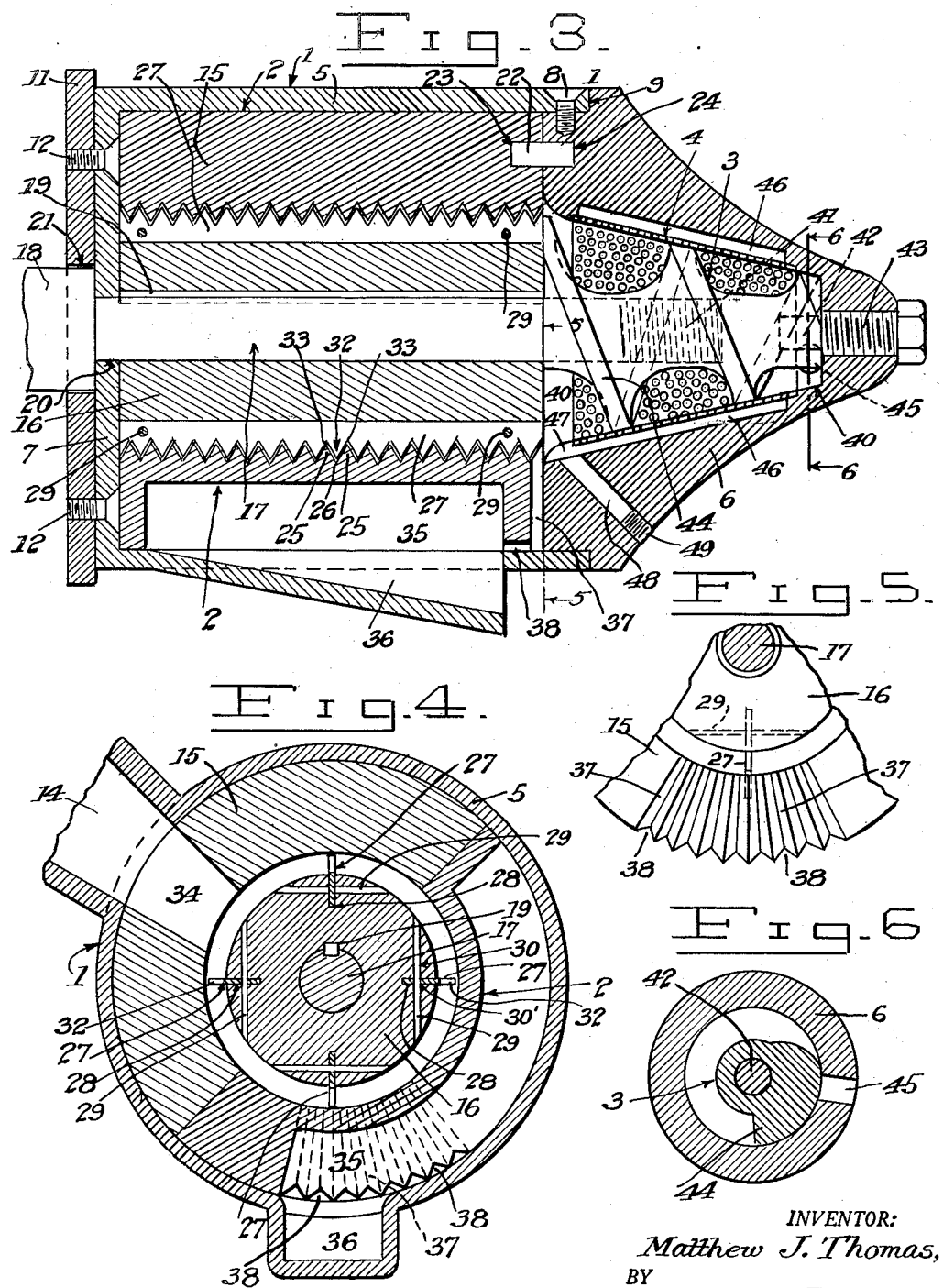

Patented July 4, 1950

2,513,974

UNITED STATES PATENT OFFICE 2,513,974

JUICE EXTRACTING MACHINE

Matthew J. Thomas, Los Angeles, Calif.

Application June 19, 1944, Serial No. 540,958

3 Claims. (Cl. 100—48)

1

This invention is a juice extracting machine, particularly useful for comminuting whole fruit, vegetables, or the like into pulp, and separating the juice from the pulp and recovering the juice; and this invention is an improvement on my Juice Extracting Machine covered by my United States Letters Patent, No. 2,315,028, dated March 30, 1943.

The general object of the invention is to provide a juice extracting machine of the character stated, by means of which the pulp of the comminuted whole fruit, vegetable or the like is thoroughly compressed and the juice finely strained from said pulp, and the juice and the pulp separately delivered from the machine, permitting continuous operation of the machine.

Another object is to provide a juice-extracting machine of the character stated for compressing and whipping the pulp to squeeze the juice therefrom.

Other objects and advantages will appear hereinafter as this specification progresses.

The invention is illustrated in the annexed drawing, which forms a part of this specification and in which:

Fig. 1 is a side elevation of my invention.

Fig. 2 is a rear end elevation of my invention, as shown in Fig. 1.

Fig. 3 is a vertical longitudinal section of my invention taken on line 3—3 of Fig. 2.

Fig. 4 is a transverse vertical section of my invention taken on line 4—4 of Fig. 1.

Fig. 5 is a fragmentary transverse vertical section of my invention taken on line 5—5 of Fig. 3.

Fig. 6 is a transverse vertical section of my invention taken on line 6—6 of Fig. 3.

Fig. 7 is a fragmentary vertical longitudinal section of a modification of my invention.

Fig. 8 is a transverse vertical section of the modification of my invention shown in Fig. 7 taken on line 8—8 of Fig. 7.

Fig. 9 is a side view of the rotor of the masticator of my invention.

Referring more particularly to the drawings, in which corresponding parts are designated by the same reference characters in all of the figures, my invention includes generally a casing 1; a masticator 2 for masticating whole fruit, vegetables and the like; a conical helical compressor 3 for compressing the pulp of said masticated fruit, vegetables and the like, for extracting the juice therefrom; and a conical screen 4, in which said conical compressor is rotatably fitted, for straining the juice extracted from said pulp by said compressor.

2

The casing 1 comprises an annular cylindrical body member 5 and a rear end member 6, which body member is closed at it forward end by an integral end wall 7, and at its rear end by said rear end member 6, which is detachably secured in said rear end of said body member by screws 8 extended through the rear end of the wall of said body member and threaded in the forward end of said rear end member, there being an annular external shoulder 9 formed on said rear end member 6 near its forward end for engaging the rear end of the wall of said body member 5 for determining the position to which said rear end member is inserted and fitted in the rear end of said body member. The casing 1 is detachably secured to one end of an electric motor 10 by means of a plate 11, screws 12 and bolts 13, to which plate the forward end wall 7 of the casing body member 5 is secured by said screws 12, and which plate 11 is secured by said bolts 13 to said end of said motor 10. In the upper part of the body member 5 of the casing 1 is formed a hopper 14 through which whole fruit, vegetables or the like are fed into the masticator 2 mounted in said body member of said casing.

The masticator 2 comprises an annular stator 15 and a cylindrical rotor 16, which stator is fitted within the cylindrical body member 5 of the casing 1, and which rotor is keyed on the reduced end of portion 17 of the shaft 18 of the motor 10, by a key 19, within said stator 15, there being an opening 20 in the forward end wall 7 of the casing body member 5 through which said reduced end portion of said motor shaft extends, and an opening 21 in the plate 11, through which extends a short portion of the motor shaft at the inner end of said reduced end portion. Said stator 15 is secured against rotation in the casing body member 5 by a dowel 22 extending in opposite directions into sockets 23 and 24, respectively, in the rear end of said stator and in the inner forward end of the rear end member 6 of the casing 1. The inner periphery of the stator 15 is formed with a plurality of annular V-shaped ribs 25 arranged side-by-side progressively from end to end of the stator, with annular V-shaped grooves 26 therebetween. A plurality of toothed cutter blades 27, preferably four, are detachably secured in radial slots 28, respectively, in the rotor 16, by pins 29, respectively, which slots extend inwardly from the periphery of said rotor and longitudinally the length of said rotor at an angle to the axis of the rotor (Fig. 9), and which cutter blades extend outwardly from said slots beyond the periphery of said rotor, the length of said rotor, while said pins 29 are driven through bores 30, arranged in chord relation, in the stator 15 and through openings 30' in said cutter blades 27 near the ends respectively, of said cutter blades. The outer edges of the cutter blades 27 are formed with V-shaped teeth 32 and V-shaped notches 33 between said teeth progressively, from end to end of said blades, which teeth extend into the annular grooves 26 in the inner periphery of the stator 15, while said notches receive the annular ribs 25, respectively, projecting from said inner periphery of said stator. The stator 15 is provided with an opening 34 extending therethrough from the lower end of the hopper 14 to the inner periphery of said annular stator, through which opening whole fruit, vegetables and the like pass from said hopper to the teeth 25 and 32 of the masticator 2. In the lower side of the stator 15 is formed a recess 35 in communication with a downwardly inclined trough 36 formed below said recess in the lower portion of the wall of the body member 5 of the casing 1. In the rear end of the stator 15 below the rotor 16 are provided a plurality of radial V-shaped grooves 37 arranged adjacent each other and extending from the inner periphery to the outer periphery of said stator at the lower side thereof, and said stator is provided with a plurality of V-shaped grooves 38 in its outer periphery at the lower side thereof leading forwardly from the lower ends of the grooves 37, respectively, into the rear end of the recess 35 in said stator, through which grooves some of the juice extracted from the fruit and the like by the masticator 2 may pass into the recess 35 and out of the machine through the trough 36 in the manner hereinafter more fully described.

The rear end member 6 of the casing 1 is formed with a longitudinal rearwardly tapering conical bore 40, which extends from the forward end of said end member the greater portion of the length of said member, coaxial with the motor shaft 18 and the compressor 3, which compressor is screw seated at 41 on the rear end of the reduced end portion 17 of said motor shaft, within said conical bore, and extends from the forward end of said bore adjacent the rear end of the masticator 2 of the rear end of said bore.

The compressor 3 is centered and journaled at its rear end on a reduced end extension 42 of a bolt 43 which is screw seated in the rear end of the rear end member 6 of the casing 1. In said conical bore 40 is fitted and countersunk the conical screen 4 surrounding the conical compressor 3, which is formed with a helical blade 44, decreasing progressively rearwardly in diameter and closely fitted to the inner surface of said conical screen, for compressing the pulp of the masticated fruit, vegetables or the like within said screen in the manner and for the purpose hereinafter more fully described. In the rear part of the rear end member 6 of the casing 1 is provided an outlet 45 for the compressed pulp, which outlet leads from one side of the conical bore 40, at the rear end of said bore and beyond the rear end of the conical screen 4, and extends through one side of said rear end member 6 of the casing 1. The conical bore 40 is enlarged around the conical screen 4, forming an annular recess 46 around said screen to receive the juice of the pulp of the fruit, vegetables or the like, which juice is squeezed from said pulp through said screen, as said pulp is compressed by the compressor 3, in the manner hereinafter more fully described. From the forward end of the annular and conical recess 46, at the lower side thereof, extends a juice outlet groove 47 and an auxiliary juice outlet duct 48, which outlet groove leads through the forward end of the rear end member 6 of the casing 1 to the upper ends of the radial grooves 37 in the rear end of the stator 15 in the lower portion thereof, and which auxiliary outlet duct leads downwardly through the lower side of said rear end member 6 and is normally closed by a screw plug 49.

The operation of my invention as above described is as follows:

The masticator rotor 16 and the compressor 3 of my juice extracting machine are rotated by the motor 19, through the motor shaft 18 and its reduced end portion 17, while whole fruit, vegetables or the like are fed through the hopper 14 and the opening 34 into the masticator 2 and are masticated and reduced to a pulp and some of the juice is squeezed from said fruit, vegetables or the like, by the rotation of the teeth 32 of the rotor blades 27 in the annular grooves 26 between the annular ribs 25 of the stator 15. As the rotor 16 continues to rotate and the fruit, vegetables or the like are masticated and some of the juice squeezed therefrom, as aforesaid, the pulp and juice of said masticated fruit, vegetables or the like remaining in said pulp are fed rearwardly through the masticator 2 by the inclined toothed blades 27 of the rotor 16, and said pulp passes from the rear end of the masticator 2 into the forward end of the rotating compressor 3, while said juice flows from the rear end of said masticator downwardly through the grooves 37 and forwardly through the grooves 38 into the recess 35 and out of the casing member 5 through the trough 36 into a receptacle 50 below the lower end of said trough. The pulp fed into the forward end of the compressor 3 is fed rearwardly and is compressed by said compressor in the rearwardly tapering conical bore 40 in the rear end member 6 of the casing 1 until the pulp is fed to and completely compressed in the rear end of the rearwardly tapering conical bore 40 in said rear end casing member 6, from which end of said bore the compressed pulp is forced out through the outlet 45 into a receptacle 51, and during said feeding and compressing operation of the pulp, the remaining juice of the fruit, vegetable or the like in said pulp is squeezed out of the pulp by said compressor and strained through the fine screen 4 into the annular recess 46 in the rear end casing member 6, from which recess said strained juice passes out through the groove 47 into the upper ends of the radial grooves 37 and then downwardly through the radial grooves 37 and rearwardly through the grooves 38 into the recess 35 from which said juice passes out of the machine through the trough 36 into the receptacle 50.

If it should be desired to drain the juice from the annular recess 46 through the outlet duct 48 the screw plug 49 is removed from the lower end of said duct and a receptacle is placed under the lower end of said duct to receive the juice drained through said duct.

In the modification of my invention shown in Figs. 7 and 8 the conical and helical compressor 53 formed with a rearwardly tapering helical blade 54 is shorter than the compressor 3 and is formed with a straight diametrical whipping blade 55 projecting rearwardly from the rear end of said compressor to the rear end of the bore 40 in the rear end member 6 of the casing 1, and a pulp outlet 56 is substituted for the pulp outlet 45, which pulp outlet 56 is provided in the rear end of said rear end casing member 6 and extends axially of the bore 40 and said compressor, the bolt 43 of the form of my invention shown in Figs. 1 to 6 being eliminated.

The operation of this modification of my invention is substantially the same as the operation of my invention as shown and described in Figs. 1 to 6 inclusive and Fig. 9, the compressor 53 compressing the pulp and squeezing the juice through the screen 4, but the straight diametrical whipping blade 55 whips the pulp and separates the finest remaining fibers from the pulp and forces the remaining juice from the pulp through the screen 4 into the annular recess 46, and said whipped pulp is forced out by the compressor 53 through the axial outlet 56 in the rear end of the rear end member 6 of the casing 1. The juice is recovered from this modification of my invention in the same manner as it is recovered from my invention as shown and described in Figs. 1 to 6 inclusive and Fig. 9.

I claim:

1. A juice extracting machine comprising a masticator, a rotary compressor formed with a conical helical blade and a whipper blade at the remote end of said helical blade, into which compressor the masticated product passes from said masticator and is compressed by said compressor into a pulp, a conical screen in which said conical helical blade and said whipper blade are rotatably fitted and through which the juice of the pulp of said product is squeezed and screened by said helical blade and said whipper blade of said compressor, means for delivering said screened juice, and means for delivering the pulp compressed by said compressor.

2. A juice extracting machine comprising a masticator for masticating a juice-containing product into a pulp and discharging it at one end thereof, a compressor into which said pulp is delivered from said discharging end of the masticator and which compresses said pulp and squeezes the juice therefrom, said masticator being formed with an outlet recess and with grooves at said discharging end leading into said recess through which grooves some of the juice from said masticated product passes from said masticator into said outlet recess, means for delivering said juice squeezed by said compressor into said grooves to pass into said outlet recess, and means whereby the compressed pulp is delivered from the machine by operation only of said compressor.

3. A juice extracting machine as claimed in claim 1, in which the whipper blade extends diametrically of the rotary compressor and rearwardly from the remote end of the conical helical blade of said compressor.

MATTHEW J. THOMAS.

REFERENCES CITED

The following references are of record in the file of this patent:

UNITED STATES PATENTS

| Number | Name | Date |
| --- | --- | --- |
| 941,073 | Iitsuka | Nov. 23, 1909 |
| 1,527,911 | Patti | Feb. 24, 1925 |
| 1,750,764 | Schaefer | Mar. 18, 1930 |
| 1,855,369 | Tessandori | Apr. 26, 1932 |
| 1,989,231 | Gilliatt | Jan. 29, 1935 |
| 2,223,772 | Waller et al. | Dec. 3, 1940 |
| 2,315,028 | Thomas | Mar. 30, 1943 |
| 2,345,683 | Owens | Apr. 4, 1944 |